(No Model.) 6 Sheets—Sheet 1.
B. H. COOK.
MACHINE FOR CLEANING AND POLISHING BOOTS AND SHOES.
No. 459,880. Patented Sept. 22, 1891.
FIG. 1.
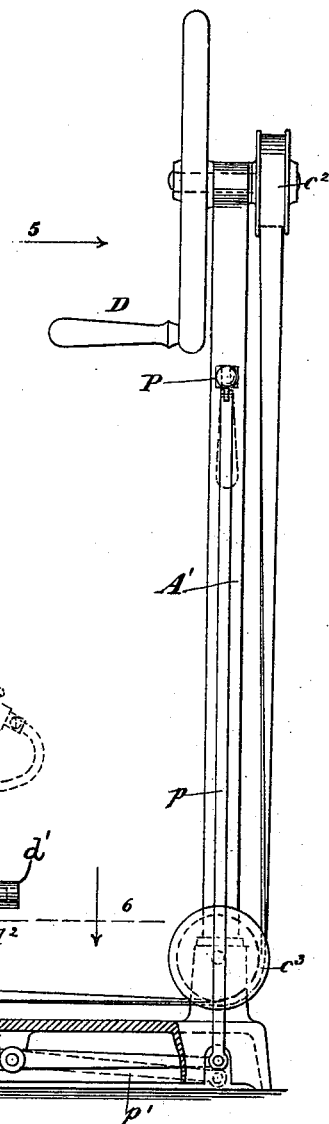
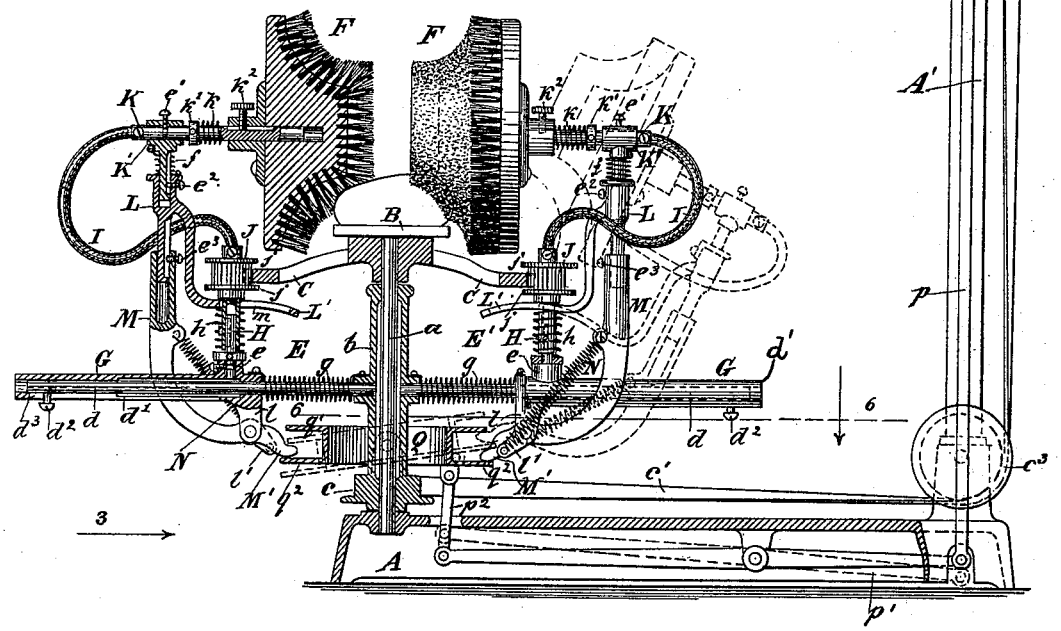
FIG. 6.
WITNESSES:
John Becker
Fred White
INVENTOR:
Burton H. Cook,
By his Attorneys, (No Model.) 6 Sheets—Sheet 2.
B. H. COOK.
MACHINE FOR CLEANING AND POLISHING BOOTS AND SHOES.
No. 459,880. Patented Sept. 22, 1891.
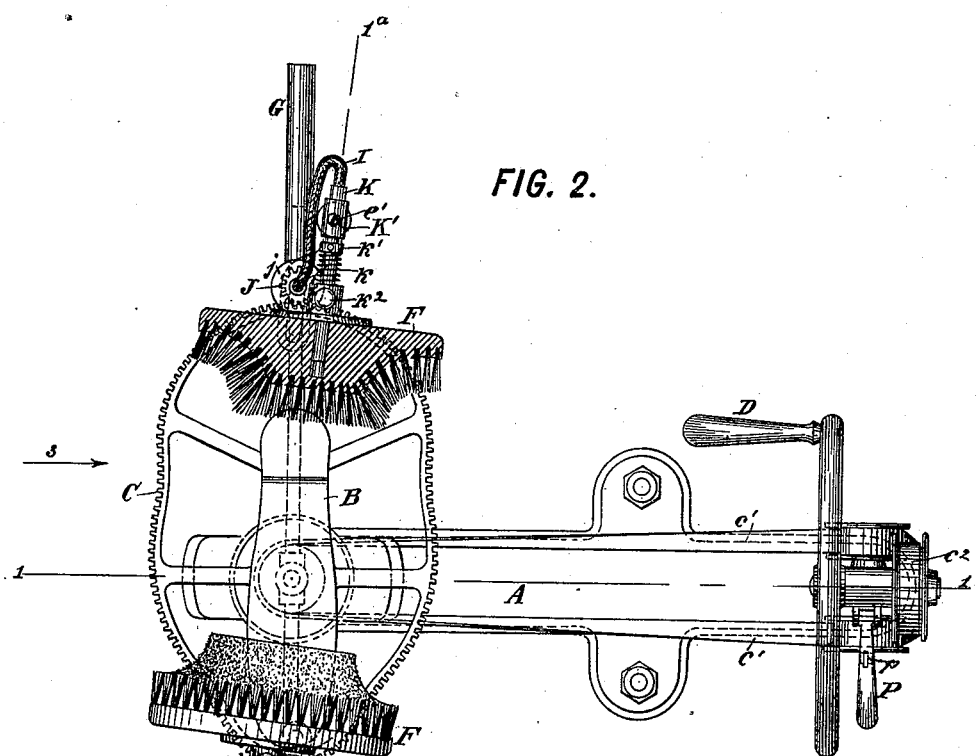
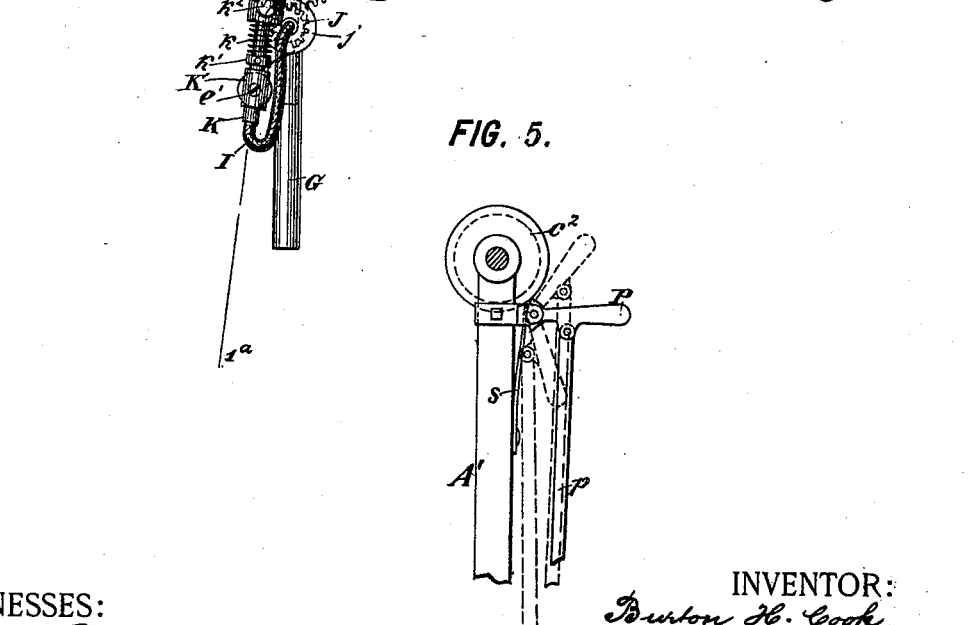
WITNESSES:
John Becker
Fred White
INVENTOR:
Burton H. Cook,
By his Attorneys,
Arthur C. Fraser & Co.

(No Model.)
6 Sheets—Sheet 3.

B. H. COOK.
MACHINE FOR CLEANING AND POLISHING BOOTS AND SHOES.

No. 459,880.
Patented Sept. 22, 1891.

WITNESSES:
John Becker
Fred White

INVENTOR:
Burton H. Cook,
By his Attorneys,
Arthur G. Fraser & Co.

(No Model.) 6 Sheets—Sheet 5.
B. H. COOK.
MACHINE FOR CLEANING AND POLISHING BOOTS AND SHOES.
No. 459,880. Patented Sept. 22, 1891.

WITNESSES:
John Becker
Fred White

INVENTOR:
Burton H. Cook,
By his Attorneys,
Arthur E. Brasier & Co.

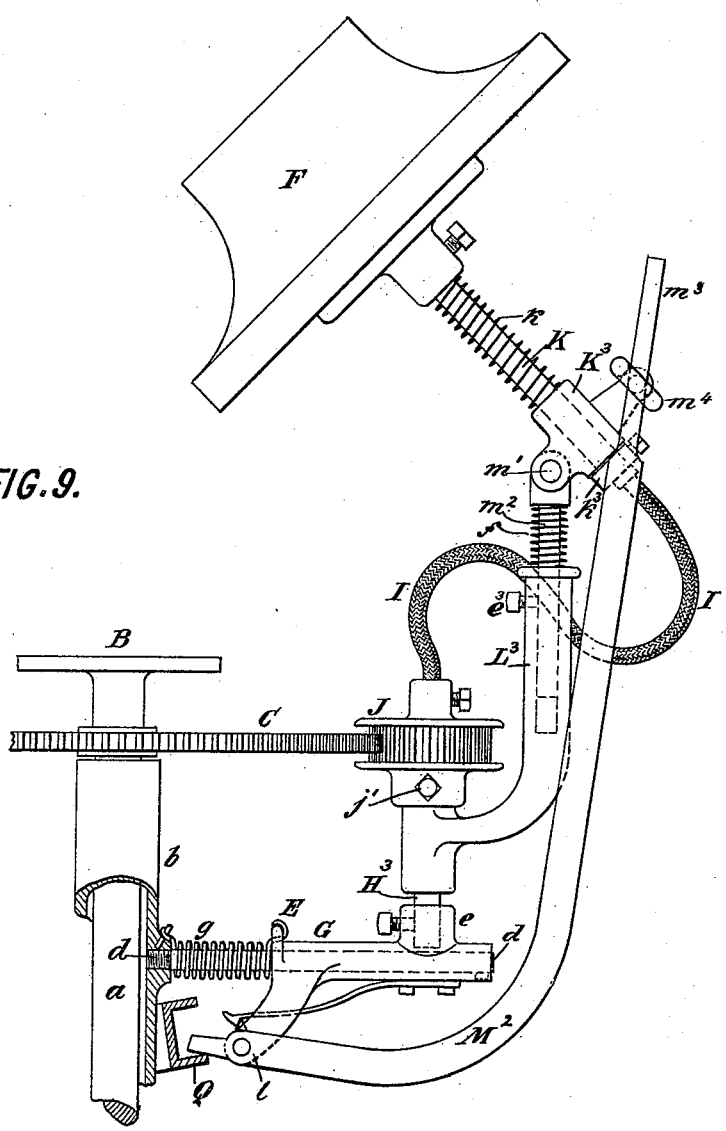

UNITED STATES PATENT OFFICE.

BURTON H. COOK, OF BROOKLYN, NEW YORK.

MACHINE FOR CLEANING AND POLISHING BOOTS AND SHOES.

SPECIFICATION forming part of Letters Patent No. 459,880, dated September 22, 1891.

Application filed July 14, 1890. Serial No. 358,667. (No model.)

*To all whom it may concern:*

Be it known that I, BURTON H. COOK, a citizen of the United States, residing in Brooklyn, in the county of Kings and State of New York, have invented certain new and useful Improvements in Machines for Cleaning and Polishing Boots and Shoes, and for Similar Purposes, of which the following is a specification.

This machine comprises a foot-rest on which the person using it places his foot, and one or more revolving brushes arranged to travel around the foot, with driving mechanism for imparting motion to these brushes and cam devices for directing them to different positions in the different portions of their travel around the foot, in order that they may accommodate themselves to the shape of the foot and be caused to act effectively against all portions of the shoe.

Figure 3:
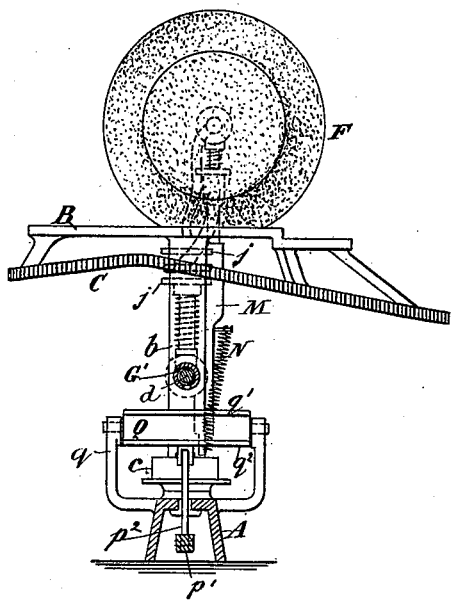
Figure 4:
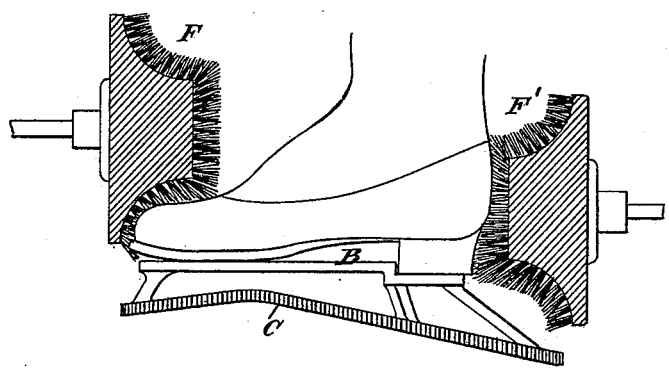
Figure 7:
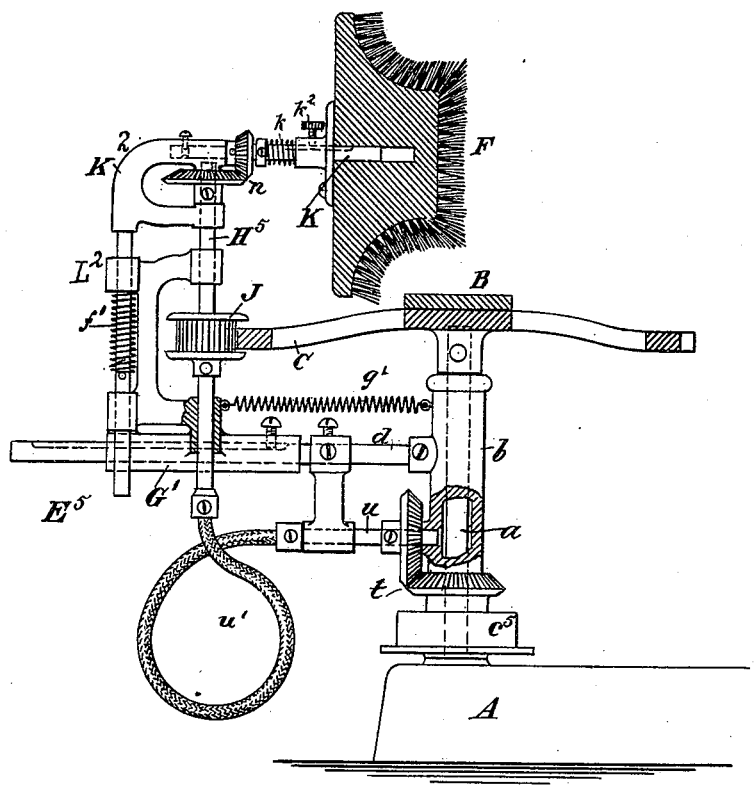
Figure 8:
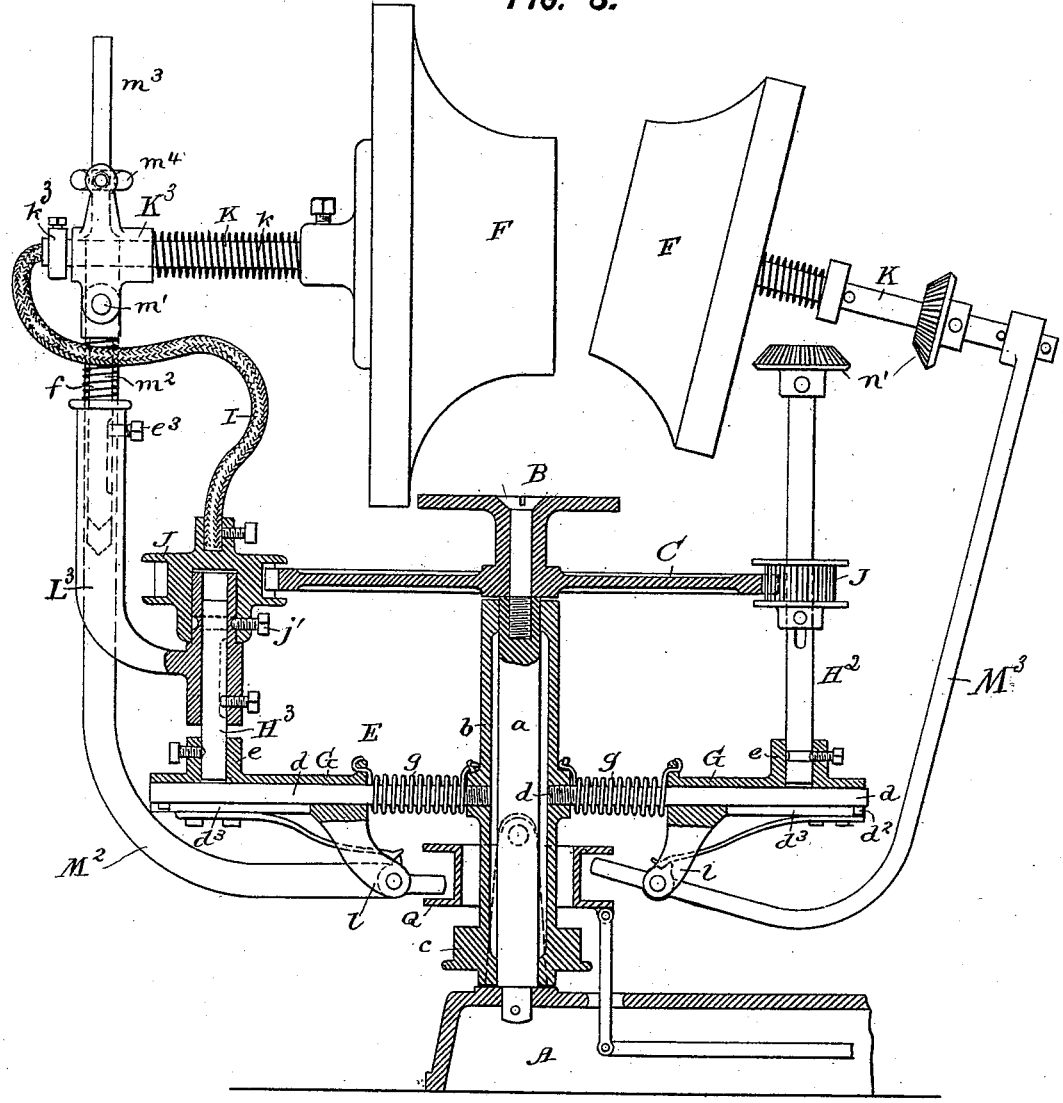

Figure 1 of the accompanying drawings is a vertical section of the machine, cut through the base in the plane of the line 1 1 in Fig. 2 and through the brushes in the plane of the line $1^a$ $1^a$ therein. Fig. 2 is a plan of the machine, one of the brushes being in horizontal section in the plane of its axis. Fig. 3 is a side elevation looking in the direction of the arrow 3 in Figs. 1 and 2. Fig. 4 is a similar side elevation of the foot rest, showing the operation of blacking a shoe. Fig. 5 is a fragmentary elevation looking in the direction of the arrow 5 in Fig. 1, the crank-wheel being removed. Fig. 6 is a fragmentary plan cut on the line 6 6 in Fig. 1. Fig. 7 is a view answering to Fig. 1, and showing a modification; and Fig. 8 is a fragmentary view similar to Fig. 1, and showing a modification. Fig. 9 is a view of Fig. 8, showing the parts in another position.

I will proceed to describe the construction shown in Figs. 1 to 6. A suitable base A is fastened to the floor or any suitable platform or support, and at one end has a post or rod $a$, projecting fixedly from it in vertical direction and carrying on its top the foot-rest B, the shape of which is clearly shown in Figs. 2 and 3. Directly beneath this rest is fastened an endless cam-rack C, of sinuous contour, having gear-teeth on its outer side and formed with its different portions at different levels or inclinations, all as clearly shown in Figs. 3 and 4. Turning freely on the post $a$ is a tubular shaft or sleeve $b$, constituting the hub of a rotary frame or carrier E. On the lower end of this sleeve $b$ is fixed a pulley $c$. This sleeve or hub is rotated by a belt $c'$, passing around this pulley.

In the construction shown the machine is driven by a crank-wheel D, the shaft of which is mounted in bearings on the top of a post A', projecting upwardly from one end of the base A. The crank-shaft carries a belt-pulley $c^2$, over which the belt passes, extending thence downwardly and bending at right angles around guide-pulleys $c^3$ at the base of the post. By turning the crank D rotative motion is communicated through the belt to the pulley $c$, whereby the sleeve or hub $b$ is rotated around the post $a$.

The rotary carrier E constitutes the frame by which the rotary brushes F F are carried around the shoe to be polished. By preference two brushes are employed, one being supplied with moist blacking in order to apply it to the shoe, taking the place of what is commonly called the "dauber" brush, while the other is a dry brush used solely for cleaning and polishing. As both brushes are mounted in exactly similar manner, except that the polisher preferably rotates more rapidly than the dauber, a description of one side or half of the carrier-frame E will suffice for both. The hub or sleeve $b$ of this frame carries a rigidly-projecting radial bar or arm $d$, on which slides the supplemental frame G, movable radially toward and from the center, but normally drawn toward the center by the tension of a spring $g$. This frame G is constructed of a tube $d'$, embracing the bar $d$, and prevented from turning thereon by a pin $d^2$, working in a pin-slot $d^3$ in the tube. A rotative shaft H is carried by the frame G, projecting vertically therefrom, its lower end being stepped in a bearing $e$ therein. On this vertical shaft H is splined a pinion J, the teeth of which mesh with those of the sinuous rack C, being kept in mesh therewith by the tension of spring $g$. The pinion J has flanges $j$ $j$ on its top and bottom, which flanges project on opposite sides of the sinuous rack or cam bar C. A spring $h$, carried by the shaft H, presses continually upwardly against the pinion J, thrusting its lower flange against the under side of the rack C. As the frame E is revolved the pinion J is caused to travel around the rack C, moving toward or from the axis of rotation, according to the sinuosities of the rack. The pinion is thus driven by the rack, rolling around it after the manner of a planet-wheel. Being splined to the shaft H, it imparts rotation thereto. As the pinion J encounters the rising and falling portions of the cam-rack C it moves up and down, its flanges $j\,j$ and spring $g$ keeping it always in mesh with the rack. The rotation thus imparted to the shaft H is communicated through a flexible shaft I to a horizontal shaft K, also arranged radially, on the inner end of which is carried the brush F, which is constructed preferably of the shape shown. Thus the brush F is revolved while it travels around the shoe. The shaft K is held in a frame K', forming a bearing for the shaft, a screw $e'$ entering a groove in the shaft and serving to prevent longitudinal movement of the shaft relatively to its frame. The frame K' extends downwardly, and its lower end is mounted on a frame L through the medium of a vertically-sliding connection therewith. This connection is shown to be constructed by the lower end of the frame K' entering a socket in the frame L, a screw $e^2$ being arranged to project into this socket with its inner end engaging a spline or groove in the frame K' to prevent rotative or angular movement of this frame relatively to the frame L. A spring $f$ is interposed between the frames L and K', its action being to tend to draw them together; or, in other words, it exerts a downward tension on the frame K' and consequently on the shaft K and brush F, serving thereby to keep this brush pressed down firmly against the shoe. At the same time the brush F is pressed inwardly toward the shoe by a spring $k$ on the shaft K reacting against a collar $k'$ and pressing against the hub of the brush F. This brush is mounted on the shaft K through the medium of a spline or feather connection, so that it may slide longitudinally thereon. Its hub is provided with a screw $k^2$, the inner end of which enters a groove in the shaft K. The end of the screw, when it strikes the end of the groove, serves as a stop to prevent the brush F being pressed off from the shaft K by the tension of the spring $k$ when the foot or shoe of the operator is not in position on the rest B.

The frame L is constructed at its lower end to make a vertically-sliding connection with a frame M. This frame M is carried by the slide G and normally moves with it, maintaining a position with its upper portion projecting vertically upward from the slide G. The lower end of the frame L is shown as constructed as a cylindrical bar entering and sliding freely into a tubular socket in the upper end of the frame M. A screw $e^3$, screwed into this socket, has its inner end entering a groove in the lower part of the frame L to prevent its twisting or angular movement relatively to the frame M. The frame L is moved up and down through the medium of an arm L', formed on it, which extends beneath the pinion J, preferably between the pinion and its spring $h$, and consequently by receiving the upward pressure of this spring is held firmly against the under side of the pinion, and as the pinion is moved up or down by the rising or falling portions of the cam-rack C this arm L' moves up and down with it and communicates the movement to the frame L. Through this frame the frame K', shaft K, and brush F are caused to rise and fall during the travel of the brush around the shoe. The brush F, which is preferably of the shape shown, having a flat end and a concave or quarter-round side portion, is caused to rise and fall and to move toward and from the center of rotation in order to adapt it to the shape of the foot. Both the vertical and the radial movements of the brush are controlled by the cam-rack C, the radial movements of the brush following the sinuosities of the cam-rack in thrusting the pinion J radially outward or permitting it again to approach the center at different portions of the revolution, while the rising and falling movements are governed by the differences in level of the cam-rack at different parts. Fig. 3 shows how this rack descends toward the heel end of the foot-rest, and also how it is highest at the ball of the foot, and descends thence slightly toward the toe. By reason of the shape of this rack the brush connecting on the toe of the shoe stands higher than when polishing the heel, as shown by the brushes in these two extreme positions. Starting from the position at the toe shown at the left in Fig. 4, the brush in its travel around the foot moves slightly upward and inward as it approaches the ball of the foot and commencing at the ball to move outwardly relatively to the foot. As the instep is reached, the brush is moved far enough out to present its end to act against the side of the shoe, so that its bristles may reach into the hollow of the instep and be effective to polish that portion of the shoe. Continuing this movement toward the heel, the brush continually descends while moving far enough from the central axis to retain the same position relatively to the foot. Thus the end of the brush polishes the sides and heel of the shoe, while the concave portion of the brush polishes the toe and ball portion. The brushes are so mounted that either may be turned back out of action or away from the foot to the position shown at dotted lines in Fig. 1. In this position the brush will revolve idly without acting upon the shoe. To provide for thus throwing out the brush I employ by preference the construction shown, wherein the frame M is pivotally attached to the slide G. The latter is provided with downwardly-projecting ears or lugs $l$, between which the lower portion of the frame M is pivoted. The frame is movable on this pivot between the positions shown in full and dotted lines.

In either position it is held by a tensile-spring N, attached at one end to the frame M and at the other end to an arm $l'$, projecting from one of the lugs $l$. The pull of this spring extending to one side of the pivotal axis tends in either position of the frame M to draw the frame further from its mid-position, and consequently since the frame is provided with stops for arresting it in its extreme positions the spring serves to keep it pressed firmly against one or the other of these stops. In the construction shown these stops consist of the opposite ends of a slot $m$ in the arm L', which ends come in contact with the shaft H, but any other suitable stops might be employed instead.

The frames M, carrying the respective brushes, may be turned in or out from one position to the other by hand, if desired; but preferably some mechanical means is provided for tilting these frames. The preferred means is that shown. On the standard A' is pivoted a hand-lever P, arranged within easy reach of the operator and movable to three different positions, as shown in Fig. 5. To this lever is pivoted a rod $p$, the lower end of which is jointed to a lever $p'$, arranged within the hollow of the base A and fulcrumed thereto, and the other end of this lever is connected by the rod or link $p^2$ to a tilting ring or lever Q, pivoted to the uprights $q$ $q$, projecting from the base A. The lever Q incloses the hub or sleeve $b$, and has at opposite sides flanges $q'$ $q^2$, adapted to engage the tails or short arms M' of the respective frames or levers M. When the lever P is in the mid-position, the lever Q stands level, as shown in full lines in Fig. 1. In this position the tail M' passes between the flanges $q'$ $q^2$ as the frames swing around. In case it is desired to throw either brush into or out of action, the brushes will be stopped in the position shown in Fig. 1, where the tails M' of the frames M come between the flanges $q'$ $q^2$. The operator will then throw the lever P up or down, as the case may be, thereby tilting the lever Q to one side or the other of the normal position. This will throw the frame M up on one side if it be down, and down on the other if it be already up. This movement thus effects the throwing of one brush into action and the other out of action. Ordinarily only one brush will be required to operate at a time, so that by this movement the one brush that has been acting will be thrown out of action, and the other brush thrown into action simultaneously. In case it is desired to operate both brushes together, the operator may throw the second brush into operation by hand, while the lever Q stands level, the flanges $q'$ $q^2$ being wide enough apart to permit both tails M' to stand in either position while the lever Q is level.

The mechanism described will throw the brushes into action only when they stand at opposite sides of the shoe, which is the most convenient position for stopping them. After it has been used to thus manipulate the brushes it will, on the handle P being released by the operator, return to the normal position by reason of the tension of a spring $s$, which presses against the handle P.

The operation is as follows: The operator places his foot on the foot-rest B, and if the shoe be covered with dust or mud he brings the polishing-brush F against the shoe, and by turning the crank D operates the machine until this brush has been carried one or more times around the foot. He then throws this brush out of action and brings the dauber-brush F into operation, revolving it around the foot until it has applied a suitable coating of blacking to the shoe. He then turns the dauber out of action and the polishing-brush into action, and continues to drive the apparatus until the polishing-brush has imparted the desired polish to the blacking. In putting the foot on or taking it off the foot-rest both brushes may be turned outwardly; but ordinarily one will suffice.

The apparatus may be driven by power derived from any suitable source instead of by hand.

Fig. 7 shows a modification wherein the construction is somewhat altered without further changing the general design of the machine. The foot-rest B is mounted on a post $a$, fixed to the base A, as before. The swinging frame $E^5$ revolves around this post, and consists of separate frames sliding one upon another, the upper one of which carries the shaft K and the brush F. To the hub $b$ is fixed a radial bar $d$, on which moves the slide G', drawn inwardly by a spring $g'$. An upright frame $L^2$ is mounted on or made in one piece with the slide G', and this frame has bearings for the vertical shaft $H^5$, on which is fixed the pinion J, which meshes with the cam-rack C. The shaft $H^5$ may slide up and down in the bearings in the frame $L^2$. The upper frame $K^2$ also slides up and down in bearings in this frame $L^2$, being drawn downwardly by a spring $f'$. The pinion J is made with a space between its flanges sufficiently wider than the width of the cam-rack C to allow of some up-and-down movement of the frame $K^2$ for drawing the brush F down against its work. The frame $K^2$ provides bearings for the shaft K, which is driven from the shaft $H^5$ through bevel-gears $n$. The driving-pulley $c^5$, instead of being fixed on the hub $b$, as before, is mounted to rotate thereon, and drives, through intermeshing bevel-gears $t$, a horizontal shaft $u$, extending radially and mounted in bearings in the frame $E^5$. The end of this shaft $u$ drives the shaft $H^5$ through the medium of a flexible shaft $u'$, which allows for up-and-down movement of the shaft $H^5$, and for its movement toward and from the post $a$. By the rotation of the shaft $H^5$ the pinion J, by meshing with the rack C, is caused to travel around this rack, and thereby to swing the frame $E^5$ and cause the advance movement of the brush F as it rotates in contact with the shoe. Thus in this modification power is applied to the pinion J, and the swinging of the frame E⁵ is due to the engagement of this pinion with the rack C, whereas in the construction first described the power is applied directly to swing the frame E⁵, and the rotation of the shaft H⁵ and the brush results secondarily from the meshing of the pinion with the rack.

The modification here given is introduced merely as illustrating one of numerous modifications that might be made of the mechanism by means of which my invention is embodied in operative form.

My invention might be modified in various other ways without departing from its essential features.

It will be understood that the frame E⁵ in either construction includes in general the means for supporting the brush F during its revolution in such manner that it may be moved upwardly or downwardly and outwardly and inwardly, being, in fact, a mobile support for the brush. This frame might be made up in various ways of separate parts or elements connected through the medium of such mechanical connections as will admit of the requisite movement while suitably supporting the shaft K, carrying the brush. Examples of such constructions are shown in the drawings, but other mechanical expedients may be substituted.

The cam-rack C is essentially three parts: the first, a rack having teeth meshing with the pinion J; the second, a cam for imparting a radial movement, and the third, a cam for imparting the rising and falling movements to the brush. For convenience these three parts are combined in the one structure.

In Fig. 8 the right-hand brush F is the polishing-brush, which is shown as being thrown out of operation. In this construction the polishing-brush is driven by bevel-gears $n'$, mounted, respectively, on the shafts H² and K. As the frame M³ is tilted, the bevel-gears $n'$ are separated, so that the polishing-brush F ceases to revolve when thrown out of contact with the shoe. In this instance the shaft H² is splined to its pinion J in such manner that the pinion rotates the shaft, while the latter is not raised or lowered by the vertical movement of the pinion in traveling around the cam-rack C. The left-hand brush F is the dauber in this instance, and is fixed to its shaft K, which latter slides loosely in the bearing-frame K³, pivoted at $m'$ to a vertically-movable post $m^2$, which is carried by the frame L³, being drawn downwardly by the spring $f$. The frame L³ in this construction is splined to the shaft H³, which is rigid, and carries on its upper end the pinion J, which is secured to it by the set-screw $j'$, entering an annular groove in the frame L³, whereby as the pinion J rises and falls in traveling around the rack C it raises and lowers the frame L³ with it. In this instance the pinion J is much larger in diameter for the dauber than is the opposite pinion J for the polisher, whereby the dauber revolves much more slowly than the polisher. In the construction shown on the left hand in Fig. 8 the mechanism for throwing the brush F out of action consists of a separate lever M², pivoted to the lug $l$ of the slide G, and extending thence upwardly and having a reduced end $m^3$, engaging an eye $m^4$ in the bearing K³, as best shown in Fig. 9. When the brush F is to be thrown out of action, the lever M² is tilted, thereby tilting the bearing K³ on its pivotal connection $m'$ and throwing the bearing K³, shaft K, and the brush F away from the foot-rest B. In this construction the shaft K and brush F are pressed toward the foot-rest B by their spring $k$, and their inward movement is limited by the collar K³, which in this instance abuts against the outer side of the bearing K².

I claim as my invention the following defined novel features and combinations, substantially as hereinbefore specified, namely:

1. The combination of a foot-rest mounted on a vertical post, a rotative brush, a supporting-frame therefor, pivoted on said post so that it may swing around said foot-rest, means for keeping the brush while in action in contact with a shoe on said foot-rest, and driving mechanism for revolving said frame and thereby causing the brush to travel automatically around the shoe while acting against it.

2. The combination of a foot-rest mounted on a vertical post, a rotative brush, a supporting-frame therefor, pivoted on said post so that it may swing around said foot-rest, and consisting of relatively-movable sections, whereby the brush is made movable to adapt it to the shape of a shoe on said foot-rest, a cam for determining the movements of the brush, adapted to keep it while in action in contact with the shoe, and driving mechanism for revolving said frame and thereby causing the brush to travel automatically around the shoe while acting against it.

3. The combination of a foot-rest, a rotative brush, a supporting-frame therefor movable around a vertical axis, driving mechanism for rotating the brush, and a cam adapted to raise and lower the brush as it moves around the shoe.

4. The combination of a foot-rest mounted on a vertical post, a rotative brush, a supporting-frame therefor, mounted on said post so that it may swing around said foot-rest, driving mechanism for rotating the brush and causing it to travel around the foot-rest, and a cam adapted to move the brush in radial direction relatively to said post during its movement around a shoe on said foot-rest.

5. The combination of a foot-rest, a sinuous cam-rack, a pinion gearing therewith, a revolving brush connected to and driven from said pinion, and a supporting-frame for said brush and pinion adapted to communicate to the brush the movements imparted by the cam-rack to the pinion.

6. The combination of a foot-rest, a revolving brush, a supporting-frame therefor, constructed to be movable to two opposite positions, in one of which the brush approaches the foot-rest to act upon the shoe, and in the other of which the brush is remote from the foot-rest to be out of operation, and driving mechanism for rotating the brush.

7. The combination of a foot-rest, a cam-rack fixed beneath it, having a sinuous contour and constructed with inclined portions, a pinion meshing with said rack, a rotative brush, a frame for supporting said brush and pinion, mounted to swing around a vertical axis, and driving mechanism for rotating said brush and causing the brush and frame to travel around the shoe.

8. The combination of an upright post, a foot-rest on said post, a supporting-frame formed with a hub turning on said post, whereby the frame may swing around the foot-rest, a rotative brush supported by said frame, a pinion carried by said frame, and a cam-rack supported on said post, meshing with said pinion and shaped to impart rising and falling and radial movements to the pinion, said supporting-frame being adapted to communicate movements from the pinion to the brush, whereby as the brush travels around the foot-rest it is caused to move up and down and out and in to adapt itself to the shape of the foot.

9. The combination of a foot-rest, a rotative brush, a swinging frame supporting said brush and having a member movable radially, a spring for drawing said member or portion of the frame toward the central axis, a pinion carried by the sliding portion of said frame, a sinuous rack arranged to mesh with said pinion, and driving mechanism for rotating the pinion and brush and swinging the frame around its axis, whereby the pinion is kept in mesh with the rack by the tension of said spring and the pinion and brush are movable outwardly and inwardly, according to the sinuosities of the cam-rack.

10. The combination of a foot-rest, a rotative brush, a supporting-frame therefor movable around a vertical axis constructed in two sections, the one movable radially out and in and the other pivoted thereto and on which the brush is mounted, a pinion carried by the radially-movable section, a fixed rack of sinuous contour engaged by said pinion, a flexible shaft for driving the brush from said pinion, and a spring intervening between the radially-movable and pivoted sections of said frame for holding the pivoted section normally in invariable position relatively to the radially-movable section to keep the brush in operative position.

11. The combination of a foot-rest, a rotative brush, a supporting-frame therefor, mounted to swing around a vertical axis and movable to two positions, in one of which the brush is in proximity to the foot-rest for operating against the shoe, and in the other of which the brush is remote from the foot-rest and out of operation, a spring arranged relatively to said frame to hold the latter elastically in either position, and driving mechanism for rotating the brush.

12. The combination of a foot-rest, a rotative brush, a supporting-frame therefor, mounted to swing around a vertical axis and movable to two positions to throw the brush into or out of operation, an operating-handle, and mechanism interposed between said handle and frame, whereby the movement of the handle is communicated to the frame to throw the brush into or out of operation.

13. The combination of a foot-rest, two rotative brushes, supporting-frames for said brushes, constructed to be movable to two positions to throw the brushes into or out of operation, an operating-handle, and intervening mechanism between said handle and frames, adapted on the manipulation of the handle to simultaneously move one frame to throw each brush into operation and the other frame to throw each brush out of operation.

14. The combination of a foot-rest, a rotative brush, a supporting-frame therefor, mounted to swing around a vertical axis, cams for moving the brush up and down and out and in, and a spring for pressing the brush elastically against its work to cause it to adapt itself to different sizes and shapes of feet.

15. The combination of a foot-rest, a vertical post supporting it, a frame mounted to turn around said post, a driving mechanism for rotating said frame, a fixed rack, a pinion carried by said frame and meshing with said rack, whereby as the frame is revolving the pinion is rotated by said rack, a rotative brush carried by said frame, and a connection between the brush and pinion, whereby the rotation of the pinion is communicated to the brush.

16. The combination of a foot-rest, a fixed cam-rack, a rotative frame, a pinion carried thereby, meshing with said cam-rack and movable up and down thereby, a rotative brush, a shaft carrying said brush and mounted in bearings in said frame, said frame constructed to communicate to said shaft the up and down movements of said pinion, a sliding connection between the brush and its shaft, and a spring for pressing the brush inwardly.

17. The combination of a foot-rest, a frame movable around a vertical axis and constructed of sections movable relatively to one another in radial and in up and down directions, cams for effecting such movements, a rotative brush carried by said frame, whereby the brush is moved up and down and out and in by the action of said cams, a spring for drawing said brush downwardly, and driving mechanism for rotating the brush.

18. The combination of a foot-rest, the supporting-frame E, comprising a radially-movable slide or section G and a section M, pivoted thereto, a rotative brush F, carried by the latter section, and a spring N, interposed between said sections of the frame and adapted to hold the pivoted section in either extreme position.

19. The combination of a foot-rest and a supporting-frame E, mounted to swing around a vertical axis, and comprising a radially-movable member G and a vertically-movable member L, a cam-rack C, a pinion J, meshing therewith, carried by the section G and connected to the section L, to impart its rising and falling movements thereto, a rotative brush carried by the section L, and driving mechanism for rotating said brush and pinion and causing said supporting-frame to swing around its axis.

20. The combination of a foot-rest B, cam-rack C, a frame E, mounted to swing around a vertical axis, a shaft H, carried by said frame, a pinion J on said shaft meshing with said rack, a rotative brush F, the shaft K of said brush carried by said frame, a flexible shaft I, interposed between the shafts H and K, and driving mechanism for revolving the frame E.

21. The combination of a foot-rest, the rotative brush, and a supporting-frame therefor, comprising a pivoted member M, an operating-handle P, the operating-lever Q, adapted to engage said member M and throw it from one position to another, and mechanism interposed between said handle P and said lever for communicating movements from the one to the other, whereby the brush may be thrown into or out of action by the manipulation of said handle.

In witness whereof I have hereunto signed my name in the presence of two subscribing witnesses.

BURTON H. COOK.

Witnesses:
GEORGE H. FRASER,
CHARLES K. FRASER.